(12) United States Patent  
Sun et al.

(10) Patent No.: US 6,600,860 B2
(45) Date of Patent: Jul. 29, 2003

(54) METHOD OF CROSS-CONNECTING OPTICAL FIBERS

(75) Inventors: Maurice X. Sun, Westmont, IL (US); Sammy Ali, Lisle, IL (US); Igor Grois, Northbrook, IL (US); Ilya Makhlin, Wheeling, IL (US)

(73) Assignee: Molex Incorporated, Lisle, IL (US)

( * ) Notice: Subject to any disclaimer, the term of this patent is extended or adjusted under 35 U.S.C. 154(b) by 211 days.

(21) Appl. No.: 09/911,113

(22) Filed: Jul. 23, 2001

(65) Prior Publication Data

US 2003/0016925 A1 Jan. 23, 2003

(51) Int. Cl.[7] ............................................... G02B 6/44
(52) U.S. Cl. ..................... 385/115; 385/15; 385/16; 385/46; 385/47; 385/98; 385/99; 385/114; 385/116; 385/134
(58) Field of Search .................. 385/15, 16, 47, 385/98, 99, 114–116, 134

(56) References Cited

FOREIGN PATENT DOCUMENTS

| EP | 0 587 336 A2 | 3/1994 | ............ G02B/6/42 |
| EP | 1 067 418 A1 | 1/2001 | ............ G02B/6/44 |
| EP | 1 103 832 A2 | 5/2001 | ............ G02B/6/44 |
| GB | 2 367 902 A | 4/2002 | ............ G02B/6/46 |
| WO | WO 99/13367 | 3/1999 | ............ G02B/6/26 |

*Primary Examiner*—Audrey Chang
*Assistant Examiner*—Craig Curtis
(74) *Attorney, Agent, or Firm*—A. A. Tirva

(57) ABSTRACT

A method of cross-connecting or reorganizing individual optical fibers of a plurality of fiber optic ribbons include the steps of providing a substrate having an adhesive thereon with a mixing zone within the boundaries thereof. A plurality of individual optical fibers are routed onto the substrate to form a plurality of fiber optic input ribbons, reorganizing the fibers in the mixing zone, and forming a plurality of fiber optic output ribbons. At least some of the output ribbons have fibers from more than one of the input ribbons. The input and output ribbons are coated on the substrate outside the mixing zone to hold the routed fibers in ribbon form, leaving at least portions of the fibers in the mixing zone uncoated. The coated ribbons are stripped from the substrate with the uncoated fibers from the mixing zone being loose. A holding device is placed about at least the uncoated loose fibers between the input and output ribbons.

16 Claims, 3 Drawing Sheets

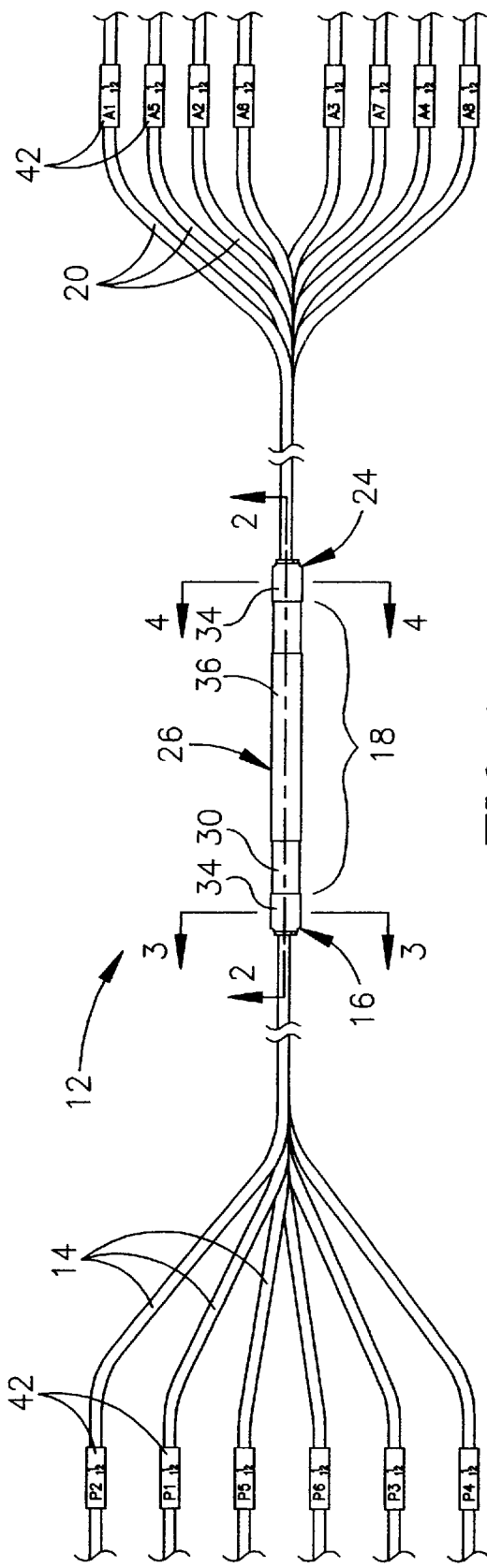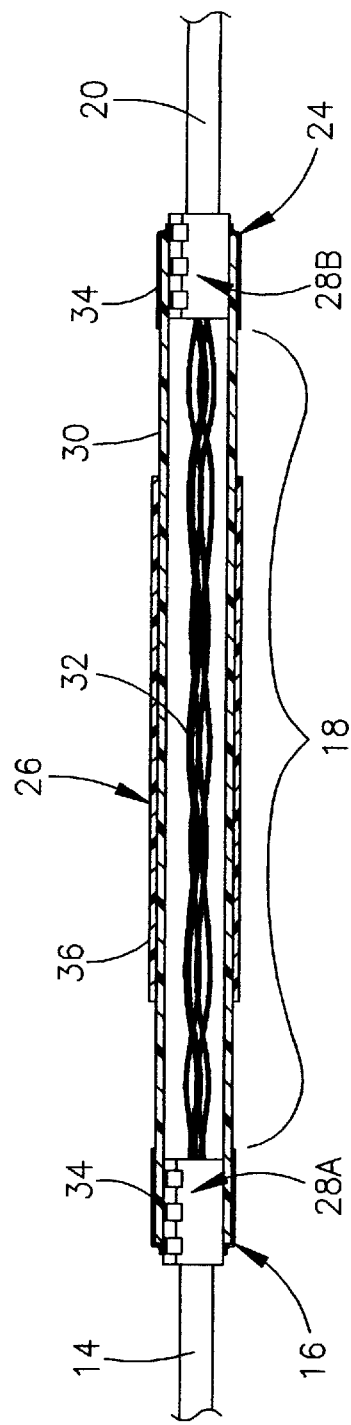

METHOD OF CROSS-CONNECTING OPTICAL FIBERS

FIELD OF THE INVENTION

This invention generally relates to the art of optical fibers and, particularly, to a method of cross-connecting or reorganizing the individual optical fibers of a plurality of fiber optic ribbons.

BACKGROUND OF THE INVENTION

Fiber optic circuitry is increasingly being used in electronics systems where circuit density is ever-increasing and is difficult to provide with known electrically wired circuitry. An optical fiber circuit is formed by a plurality of optical fibers carried by a dielectric, and the ends of the fibers are interconnected to various forms of connectors or other optical transmission devices. A fiber optic circuit may range from a simple cable which includes a plurality of optical fibers surrounded by an outer cladding or tubular dielectric to a more sophisticated optical backplane or flat fiber optic circuit formed by a plurality of optical fibers mounted on a substrate in a given pattern or circuit geometry.

One type of optical fiber circuit is produced in a ribbonized configuration wherein a row of optical fibers are disposed in a side-by-side parallel array and coated with a matrix to hold the fibers in the ribbonized configuration. In the United States, a twelve-fiber ribbon has fairly become the standard. In other foreign countries, the standard may range from as a low as four to as high as twenty-four fibers per ribbon. Multi-fibers ribbons and connectors have a wide range of applications in fiber optic communication systems. For instance, optical splitters, optical switches, routers, combiners and other systems have input fiber optic ribbons and output fiber optic ribbons.

With various applications such as those described above, the individual optical fibers of input fiber optic ribbons and output fiber optic ribbons are cross-connected or reorganized whereby the individual optical fibers of a single input ribbon may be separated and reorganized into multiple or different output ribbons. The individual optical fibers are cross-connected or reorganized in what has been called a "mixing zone" between the input and output ribbons. The present invention is directed to various improvements in this concept of cross-connecting or reorganizing the individual optical fibers of a plurality of input and output ribbons.

SUMMARY OF THE INVENTION

An object, therefore, of the invention is to provide a new and improved method of cross-connecting or reorganizing the individual optical fibers of a plurality of fiber optic ribbons.

In the exemplary embodiment of the invention, the method includes the steps of providing a substrate having an adhesive thereon with a mixing zone within the boundaries thereof. The mixing zone has a input side and an output side. A plurality of individual optical fibers are routed onto the substrate to form a plurality of fiber optic input ribbons leading into the input side of the mixing zone. The fibers are reorganized in the mixing zone and a plurality of fiber optic output ribbons are formed leading away from the output side of the mixing zone. At least some of the output ribbons have fibers from more than one of the input ribbons. The input and output ribbons then are coated on the substrate outside the mixing zone to hold the routed ribbons in ribbon form, leaving at least portions of the fibers in the mixing zone uncoated. The coated ribbons then are stripped from the substrate, with the uncoated fibers from the mixing zone being loose. A holding device is placed about at least the uncoated loose fibers between the input and output ribbons.

According to one aspect of the invention, the individual optical fibers are routed onto the substrate by a mechanical routing apparatus having a routing head. It is contemplated that more individual optical fibers may be routed to the input side of the mixing zone than are routed away from the output side of the mixing zone. At least some of the individual fibers of at least some of the input ribbons are cut off prior to being reorganized.

According to another aspect of the invention, the input and output ribbons are gathered at opposite ends of the uncoated loose fibers. The holding device is placed over the gathered ribbons adjacent the opposite ends of the uncoated loose fibers. Other features may include the step of attaching identification labels to at least some of the input and/or output ribbons. At least some of the input and/or output ribbons may be terminated in fiber optic connectors to form an optical fiber harness.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a plan view of a cross-connected optical fiber harness according to the invention;

FIG. 2 is an enlarged axial section through the ribbon holding assembly taken generally along line 2—2 of FIG. 1;

DETAILED DESCRIPTION OF THE PREFERRED EMBODIMENT

Figures 3, 4:
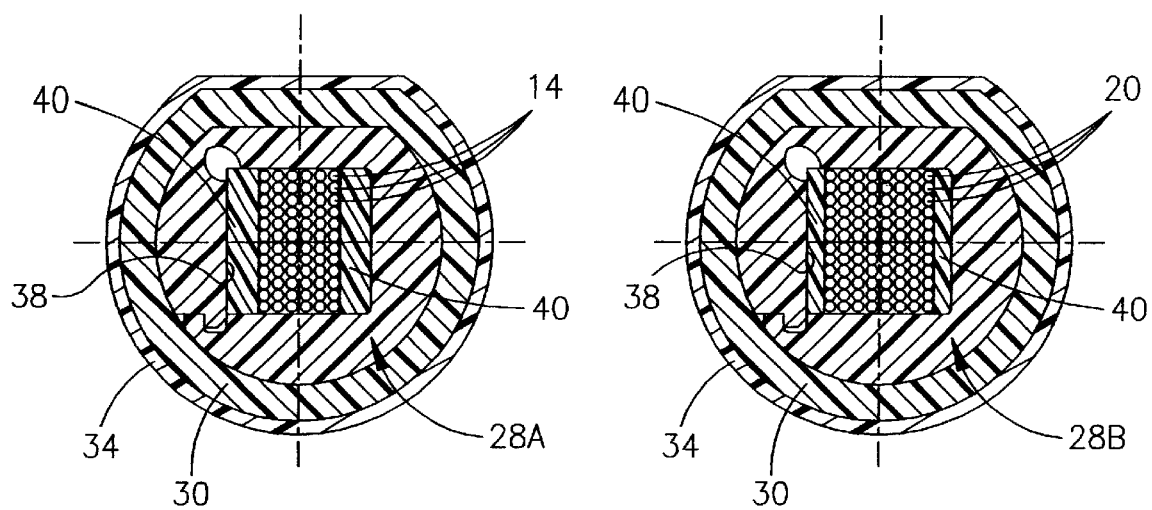
FIG. 3 is an enlarged section through the left-hand ribbon holder of the assembly, taken generally along line 3—3 of FIG. 1.
FIG. 4 is a view similar to that of FIG. 3, but of the right-hand ribbon holder, taken generally along line 4—4 of FIG. 1.

Referring to the drawings in greater detail, and first to FIG. 1, a cross-connected optical fiber harness, generally designated 12, is shown fabricated according to the invention. Basically, the harness is involved in a system for cross-connecting or reorganizing the individual optical fibers of a plurality of fiber optic ribbons. In FIG. 1, a plurality (six) of input ribbons 14 lead to an input end, generally designated 16, of a reorganizing section 18. Although not visible in FIG. 1, the fibers in the reorganizing section are maintained loose. A plurality (eight) of output ribbons 20 lead away from an output end, generally designated 24, of the reorganizing section. In the reorganizing section, the individual optical fibers from any given input ribbon 14 may be cross-connected into more than one output ribbon 20. Once all of the individual fibers of the input ribbons are reorganized and cross-connected into the output ribbons, a ribbon holding assembly, generally designated 26, is positioned about the loose fibers in the reorganizing section and clamping the input and output ribbons at opposite ends of the reorganizing section.

FIG. 2 shows a longitudinal section through ribbon holding assembly 26 to show the various components thereof. Specifically, a pair of ribbon holders, generally designated 28A and 28B, are disposed at opposite ends of the assembly and clamp onto the ribbons as will be described in greater detail hereinafter. A sleeve 30, such as of fiberglass material, extends between ribbon holders 28A and 28B spanning reorganizing section 18, and within which loose individual optical fibers 32 cross-connected between the input and output ribbons are protected. The fiberglass sleeve may be split lengthwise to facilitate positioning the sleeve around the loose fibers and around ribbon holders 28A and 28B. A pair of thermally shrinkable tubes 34 are positioned about opposite ends of sleeve 30 to surround ribbon holders 28A and 28B. The shrinkable tubes are shrunk in response to heat to clamp sleeve 30 onto the ribbon holders. Finally, for identification purposes, a cylindrical label 36 may be placed about sleeve 30.

FIGS. 3 and 4 show left-hand ribbon holder 28A and right-hand ribbon holder 28B as viewed in FIG. 1, surrounded by fiberglass sleeve 30 and shrink tubes 34. Each ribbon holder defines a rectangular or square through passage 38 for receiving the fiber optic ribbons. As stated above in relation to FIG. 1, six input ribbons 14 enter reorganizing section 18 and eight output ribbons 20 leave the reorganizing section. Therefore, ribbon holder 28A (FIG. 3) holds the six input ribbons 14, and ribbon holder 28B (FIG. 4) holds the eight output ribbons 20. In order accommodate the different numbers of ribbons within passages 38 and to maintain the ribbons in side-by-side parallel arrays, filler elements 40 are placed at opposite sides of the "bundle" of ribbons to completely fill the passages. These filler elements may be of a variety of materials, but sections of foam tape have proven effective.

Figure 5:
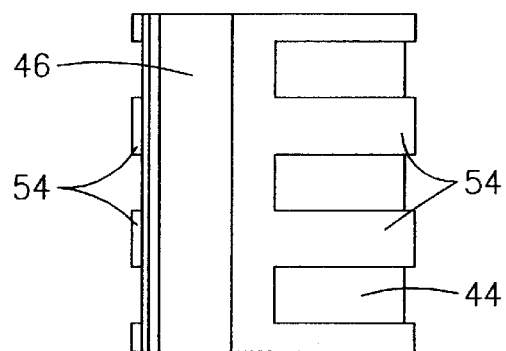
FIG. 5 is a side elevational view of one of the ribbon holders.
Figures 6, 7:
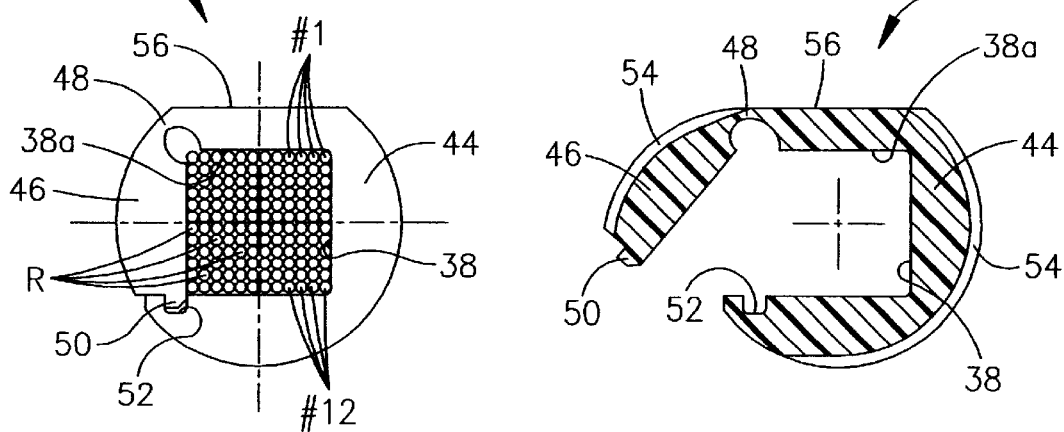
FIG. 6 is an end elevational view of the ribbon holder in closed condition and holding twelve ribbons therewithin.
FIG. 7 is a section taken transversely through the ribbon holder in its open position.

Before proceeding with the details of ribbon holders 28A and 28B in FIGS. 5–7, reference is made back to FIG. 1. It can be seen that input ribbons 14 have been identified with labels 42 having the indicia "P1–P6" to identify the six input ribbons. Similarly, output ribbons 20 have been identified with labels 42 having the indicia "A1–A8" corresponding to the eight output ribbons. Optical fiber harness 12 is used in a particular overall circuit scheme wherein it is desirable for input ribbons 14 to be maintained in a given sequence, and it is particularly important for output ribbons 20 to leave reorganizing section 18 in a particular sequence. For instance, output ribbons 20 may be connected at various physical locations in a backplane system and it is not desirable to have the ribbons twisted back and forth over each other in order to connect the ribbons. It can be seen that input ribbons 14 are maintained by ribbon holding assembly 26 in a given sequence (top-to-bottom) P2–P1–P5–P6–P3–P4 in order to conveniently arrange the input ribbons according to the circuit scheme. Similarly, output ribbons 20 are arranged top-to-bottom A1–A5–A2–A6–A3–A7–A4–A8. Ribbon holding assembly 26 allows easy maintenance of this or any other particular sequential arrangement of the ribbons.

In addition, and still referring to FIG. 1, as pointed out in the "Background", above, each fiber optic ribbon has twelve individual optical fibers as represented by "1–12" in the drawings. It is important that an operator be able to know which tiny individual fiber of each ribbon is the "1" or the "12" fiber within the ribbon, and ribbon holding assembly 26, particularly ribbon holders 28A or 28B, allow for this important organization.

With that understanding, reference is made to FIGS. 5–7 in conjunction with FIGS. 3 and 4. It should be noted that ribbon holder 28 in FIG. 6 contains twelve fiber optic ribbons "R". This is for illustration purposes only to show that the holder is capable of holding that many ribbons, versus ribbon holder 28A (FIG. 3) and ribbon holder 28B (FIG. 4) which hold six and eight ribbons, respectively. In other words, ribbon holder 28 in FIG. 6 does not need to have any filler elements 40 (FIGS. 3 and 4), because the twelve ribbons completely fill through passage 38.

As best seen in FIGS. 5–7, ribbon holder 28 includes a body 44 and a cover 46 which combine in their closed position of FIG. 6 to form interior rectangular through passage 38. The entire ribbon holder may be fabricated in one piece of molded plastic material, for instance. Cover 46 is attached to body 44 by an integral living hinge 48 formed during the molding process. The cover includes a latch boss 50, and the body includes a latch recess 52 for receiving the latch boss to hold the cover in a closed position about ribbons "R" as seen in FIG. 6. The cover can be opened as seen in FIG. 7 to allow access to through passage 38 whereby the ribbons can be placed into the passage transversely thereof. The exterior of body 44 and cover 46 are molded with serrations or circumferential ribs 54 which help sleeve 30 (FIGS. 3 and 4) and shrink tubes 34 to grip the ribbon holders.

Generally, an exterior datum means is provided at one side of the ribbon holder to identify one side of the interior rectangular through passage 38, whereby ribbons "R" can be placed in the holder in specific orientations relative to the datum means. Specifically, the datum means of ribbon holder 28 is provided by a flat surface 56 molded on the exterior of body 44 generally parallel to one side 38a of rectangular through passage 38. In essence, flat surface 56 defines a datum plane generally parallel to side 38a of the through passage.

With the provision of flat surface or datum plane 56, reference is made to FIG. 6 wherein the top individual optical fibers of all of the plurality of fiber optic ribbons "R" are identified as #1. It can be seen that all of the #1 fibers are juxtaposed against interior side 38a of through passage 38, with the #12 fibers of all of the ribbons located against the opposite interior side or wall of the through passage. With flat surface 56 being parallel to and at the same side as interior wall 38a of the through passage, an operator knows the location of all of the #1 individual optical fibers of all of the ribbons inside the ribbon holder simply by looking at the outside of the holder. In fact, flat surface 56 not only gives a visual indication of the location of the individual fibers but a tactile indication as well.

Figure 8:
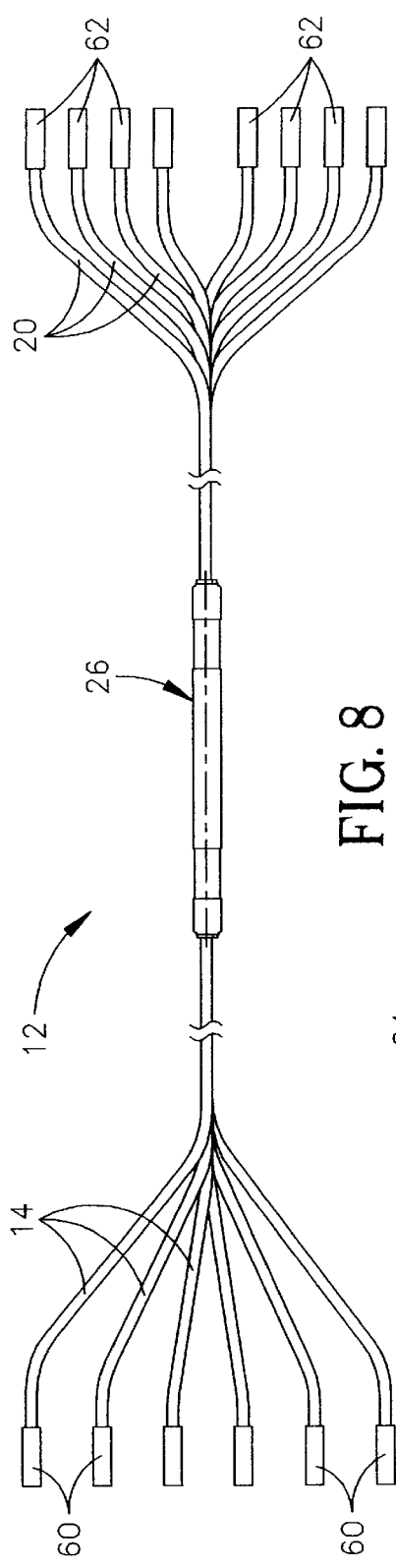
FIG. 8 is a view of the cross-connected optical fiber harness of FIG. 1, with the fiber optic ribbons terminated to a plurality of connectors.

FIG. 8 simply shows the cross-connected optical fiber harness 12 of FIG. 1 fully terminated in a harness/connector assembly. Specifically, input ribbons 14 are terminated to a plurality of fiber optic connectors 60. Output ribbons 20 are terminated to a plurality of fiber optic connectors 62.

Figure 10:
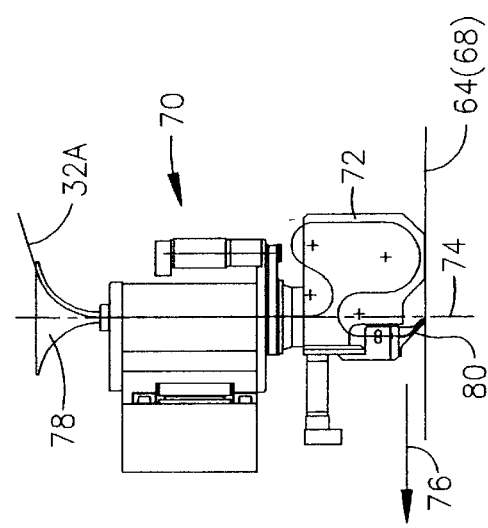
FIG. 10 is an elevational view of the routing head of the routing apparatus.
Figure 9:
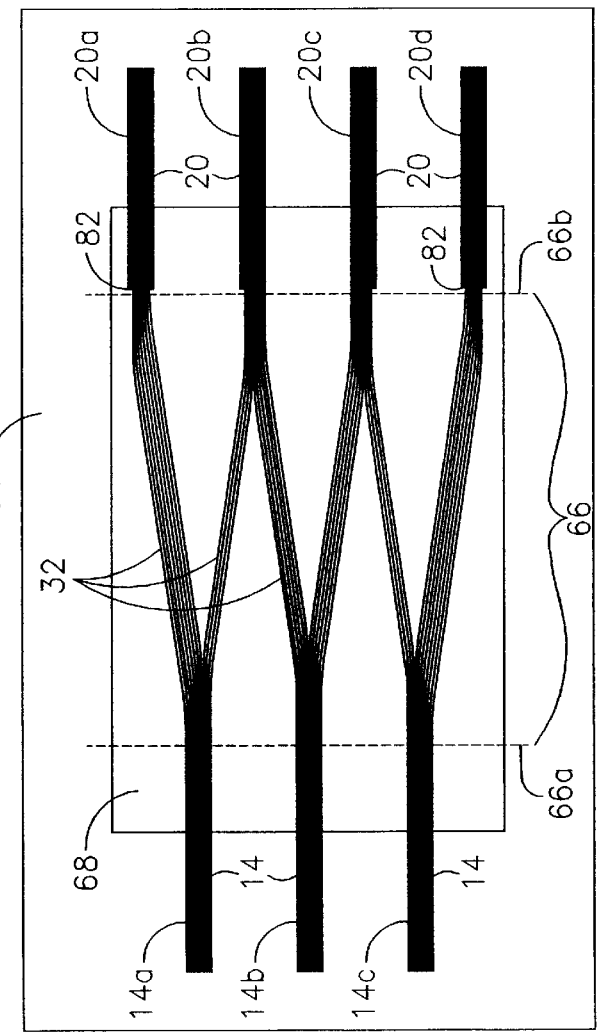
FIG. 9 is a plan view of a substrate on which a plurality of fiber optic ribbons have been cross-connected or reorganized by a mechanical routing apparatus.

FIGS. 9 and 10 show a unique method of cross-connecting or reorganizing the individual optical fibers of a plurality of fiber optic ribbons and may be used to form the cross-connected optical fiber harness of FIG. 1. Specifically, FIG. 9 shows a substrate 64 having an adhesive thereon. A mixing zone 66 is defined within the boundaries of the substrate. For explanation purposes, the mixing zone has an input side 66a and an output side 66b. Actually, a smaller substrate 68 is adhered to larger substrate 64 and encompasses the mixing zone. The smaller substrate also has an adhesive thereon. The invention contemplates using a mechanical routing apparatus (described hereinafter) for routing a plurality of individual optical fibers 32 onto substrates 64 and 68 to form a plurality of fiber optic input ribbons 14 leading to input side 66a of mixing zone 66, reorganizing the individual fibers in the mixing zone, and forming a plurality of fiber optic output ribbons 20 leading away from output side 66b of the mixing zone. In other words, input ribbons 14 and output ribbons 20 correspond to the input and output ribbons described above in relation to the cross-connected optical fiber harness 12 of FIG. 1. For illustrative purpose, only three input ribbons and four output ribbons are shown. Of course, two of such arrangements, as shown in FIG. 9, could be combined to make the arrangement as shown in FIG. 1.

In order to understand the reorganizing or mixing of individuals fibers 32 in mixing zone 66 between input ribbons 14 and output ribbons 20, the input ribbons have been labeled 14a–14c and the output ribbons have been labeled 20a–20d. It can be seen that there are three input ribbons and four output ribbons. It also can be seen in FIG. 9 that four fibers 32 from input ribbon 14a and six fibers from input ribbons 14b are mixed or combined to form output ribbon 20b. Six individual optical fibers 32 from input ribbons 14b and three fibers 32 from input ribbon 14c are mixed or combined to form output ribbon 20c. Eight individual optical fibers from input ribbon 14a and eight fibers from input ribbon 14c form output ribbons 20a and 20d, respectively. All of these fibers are mechanically routed onto substrates 64 and 68 by a mechanical routing apparatus, generally designated 70 in FIG. 10, which includes a routing head 72. The apparatus including the routing head can pivot about an axis 74 as it moves in the direction of arrow 76. An individual optical fiber 32A is fed into a funnel 78 of the apparatus and is fed to a needle 80 which applies the fiber to substrates 64 and 68, whereby the fibers are held onto the substrates by the adhesive material on the substrates. The apparatus includes a cut-off mechanism as is known in the art. Further details of such a routing apparatus can be derived from copending application Ser. No. 09/645,624, filed Aug. 24, 2000, assigned to the assignee of the present invention, and which is incorporated herein by reference. Lastly, for purposes described hereinafter, some of the individual fibers of output ribbons 20 are cut-off as at 82 (FIG. 9) before entering mixing zone 66.

After the fibers are mechanically routed onto substrates 64 and 68 as seen in FIG. 9, input and output ribbons 14 and 20, respectively, are coated with a curable plastic material on the substrates at least outside mixing zone 66 to hold the routed fibers in ribbon form. The coating may cover the fibers over opposite ends of smaller substrate 68 up to input and output sides 66a and 66b, respectively, of the mixing zone.

After fiber optic ribbons 14 and 20 are coated and the coating is cured to hold the fibers in ribbonized form, the coated fibers are stripped from substrates 64 and 68 so that ribbon holding assembly 26 (FIGS. 1 and 2) can be assembled over the loose fibers between the input and output ribbons thereof. In other words, individual optical fibers 32 that were within mixing zone 66 were uncoated and, therefore, remain loose as seen in FIG. 2. Otherwise, ribbon holding assembly 26 is installed over the ribbons and loose fibers as described above in relation to FIGS. 1–7. Labels 42 (FIG. 1) and/or connectors 60/62 (FIG. 8) may be applied or terminated to the fiber optic ribbons.

The reason that smaller substrate 68 is installed on top of larger substrate 64 is to provide a subassembly which can be stored prior to installing ribbon holding assembly 26. In other words, the coated and cured input and output ribbons 14 and 20, respectively, may be stripped from larger substrate 64 and still be adhered to smaller substrate 68 outside the bounds of mixing zone 66. This subassembly of substrate 68 and the cross-connected and ribbonized ribbons may then be shipped to another processing station or stored in inventory before installing ribbon holding assembly 26. During the transport or storing of the subassembly, loose individual optical fibers 32 still remain adhesively secured to smaller substrate 68 and the ribbons, themselves, are maintained manageable for subsequent installation of ribbon holding assembly 26. Substrate 68 is removed for installation of ribbon holding assembly 26.

Finally, as stated above, some of the individual optical fibers of output ribbons 20 are cut-off, as at 82 in FIG. 9, before extending into mixing zone 66. This is easily accomplished with mechanical routing apparatus, but it would be extremely difficult if the tiny individual fibers are routed or otherwise handled by manual manipulation. By routing twelve fibers in each input ribbon and cutting the individual fibers off even though they are not cross-connected into output ribbons 20, input ribbons 14 are maintained with twelve fibers in each ribbon. The cut-off of course could also be done on the input side. If reference is made back to FIG. 6, it can be understood that by keeping twelve fibers in each ribbon, the ribbons will fill the space within passage 38 of ribbon holder 28 between inside wall 38a and the opposite wall of the passage.

Additionally, the cut-off fibers, also known as dummy fibers, are designed into fiber routing scheme because of the ease of installation of twelve fiber ribbons into twelve channel connector ferrules.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A method of cross-connecting or reorganizing the individual optical fibers of a plurality of fiber optic ribbons, comprising the steps of:

providing a substrate having an adhesive thereon with a mixing zone within the boundaries thereof, the mixing zone having an input side and an output side;

routing a plurality of individual optical fibers onto the substrate to form a plurality of fiber optic input ribbons leading into the input side of the mixing zone, reorganizing the fibers in the mixing zone, and forming a plurality of fiber optic output ribbons leading away from the output side of the mixing zone, at least some of the output ribbons having fibers from more than one of the input ribbons;

coating the input and output ribbons on the substrate outside the mixing zone to hold the routed fibers in ribbon form, leaving at least portions of the fibers in the mixing zone uncoated;

stripping the coated ribbons from the substrate with the uncoated fibers from the mixing zone being loose; and placing a holding device about at least the uncoated loose fibers between the input and output ribbons.

2. The method of claim 1 wherein said input and output ribbons are gathered at opposite ends of the uncoated loose fibers, and the holding device is placed over the gathered ribbons adjacent the opposite ends of the uncoated loose fibers.

3. The method of claim 1 wherein said individual optical fibers are routed onto the substrate by a mechanical routing apparatus having a routing head.

4. The method of claim 1 wherein more individual optical fibers are routed to the input side of the mixing zone than are routed away from the output side of the mixing zone.

5. The method of claim 4 wherein at least some of the individual fibers of at least some of the input ribbons are cut off prior to being reorganized.

6. The method of claim 1 wherein more input ribbons are formed than output ribbons.

7. The method of claim 1, including the step of attaching identification labels to at least some of the input ribbons.

8. The method of claim 1, including the step of attaching identification labels to at least some of the output ribbons.

9. The method of claim 1, including terminating at least some of the input ribbons in fiber optic connectors to form an optical fiber harness.

10. The method of claim 1, including terminating at least some of the output ribbons in fiber optic connectors to form an optical fiber harness.

11. A method of cross-connecting or reorganizing the individual optical fibers of a plurality of fiber optic ribbons, comprising the steps of:

providing a substrate having an adhesive thereon with a mixing zone within the boundaries thereof, the mixing zone having an input side and an output side;

routing a plurality of individual optical fibers onto the substrate by a mechanical routing apparatus having a routing head to form a plurality of fiber optic input ribbons leading into the input side of the mixing zone, reorganizing the fibers in the mixing zone, and forming a plurality of fiber optic output ribbons leading away from the output side of the mixing zone, at least some of the output ribbons having fibers from more than one of the input ribbons, and at least one of the individual fibers of at least some of the input ribbons being cut-off prior to being reorganized;

coating the input and output ribbons on the substrate outside the mixing zone to hold the routed fibers in ribbon form, leaving at least portions of the fibers in the mixing zone uncoated;

stripping the coated ribbons from the substrate with the uncoated fibers from the mixing zone being loose; and placing a holding device about at least the uncoated loose fibers between the input and output ribbons.

12. The method of claim 11 wherein said input and output ribbons are gathered at opposite ends of the uncoated loose fibers, and the holding device is placed over the gathered ribbons adjacent the opposite ends of the uncoated loose fibers.

13. The method of claim 11, including the step of attaching identification labels to at least some of the input ribbons.

14. The method of claim 11, including the step of attaching identification labels to at least some of the output ribbons.

15. The method of claim 11, including terminating at least some of the input ribbons in fiber optic connectors to form an optical fiber harness.

16. The method of claim 11, including terminating at least some of the output ribbons in fiber optic connectors to form an optical fiber harness.

* * * * *